United States Patent Office 3,020,247
Patented Feb. 6, 1962

3,020,247
DYEING OF EXPANDABLE POLYSTYRENE
Joseph Bianco, Lock Haven, Pa., assignor to Koppers Company, Inc., a corporation of Delaware
No Drawing. Filed June 6, 1960, Ser. No. 33,928
9 Claims. (Cl. 260—2.5)

This invention relates to the dyeing of expandable polystyrene particles and more particularly to the dyeing of pre-expanded or unexpanded expandable polystyrene particles.

Foam polystyrene, or as it is sometimes called, expanded polystyrene, is a widely used plastic material having a closed cell structure, generally produced by the expansion of expandable polystyrene particles, which contain an organic blowing agent. These expandable polystyrene particles are capable upon the application of heat of forming a foam having any desired configuration. The foaming operation may take place in one or two steps. In the one step process the expandable particles are placed in a mold of the desired configuration and heat is applied so that the particles expand and fill the mold. In the two step process the particles are first partially expanded by heat. These particles are referred to as pre-expanded or pre-puff. The pre-expanded particles are then further molded, as in the one step process. Densities of the expanded polystyrene mass may range from about less than 1 pound per cubic foot up to about 20 pounds per cubic foot, depnding upon the amount and type of expanding agent used, and the process by which the polystyrene is expanded. These expandable particles may be made by a variety of different processes, and are commercially available. One source of supply is Koppers Company, Inc., who sells particles of this type under the trade name "Dylite" expandable polystyrene.

Foam polystyrene structures are used in a large variety of applications, such as refrigerator and freezer insulation, building panels, drinking cups, buoys, toys, novelties and display items.

Heretofore a great deal of difficulty has been encountered in producing a satisfactorily dyed particle which upon expansion yields a product of uniform color. For instance, expandable particles dyed in a bath using an acid soluble dye often produce a finished article that is mottled and subject to crocking, that is, the color rubs off of the surface, and additionally unsightly dark specks appeared to be scattered over the surface of the article in the grain boundaries between the individual particles of the expanded polystyrene.

The same type unsightly product often results when the dry coloring technique is used. In this process the expandable polystyrene particles, the dye, and a wetting agent are tumbled together in a mixer such as a dry tumbler.

A further drawback of the above processes is that they are not applicable to pre-expanded particles because of the inherent fragility of the pre-expanded particles.

It has now been found that expandable polystyrene particles, both unexpanded and pre-expanded, which on molding yield a homogeneously colored article without any of the defects of the prior art processes, may be produced by the novel process of this invention, comprising immersing expandable polystyrene particles for from 1.5 to 30 minutes in a heated aqueous dye bath of a water insoluble, organic solvent soluble, dye and a solvent selected from the group consisting of dimethyl formamide, dimethyl acetamide, dimethyl sulfoxide, and N-methylpyrrolidone, removing the particles from the bath, rinsing the particles with water, and thereafter drying the particles.

The dye may be any water insoluble, organic solvent soluble dye such as the dispersed dyes, the vat dyes, and the solvent dyes. Typical dyes are Solvent Yellow 2, C.I.–11020, Disperse Red 9, C.I.–60505, and Vat Red 1, C.I.–73360. The concentration of the dye may be varied as desired, although no deepening of the resultant color is effected at concentrations above about 5%. Thus, from an economic point of view concentrations above 5% are impractical. Depending upon the shade desired and the particular dye used, the concentration may range downward to less than 1%.

The solvent used must be selected from the group consisting of dimethyl formide, dimethyl acetamide, dimethyl sulfoxide, and n-methyl pyrroladone. If stronger solvents are used they will attack the surface of the polystyrene particles and thus cause a very unsightly appearance. If less active solvents are used there will not be sufficient coloring. The concentration of the solvent should be between about $\frac{1}{10}$ and $\frac{1}{2}$ mol per liter of water. If the more concentrated solutions are used they have a deleterious effect on the polystyrene, causing the surface to become rough, and if less concentrated solutions are used, coloring will not be satisfactory.

The dye bath is conveniently prepared by adding the dye to the solvent and then adding water which may be heated. The dye bath, for optimum results, should be heated to a temperature above room temperature, preferably from 70–80° C., but care must be exercised so that the temperature does not exceed 90° C. since at this temperature expansion of the polystyrene particles occurs prior to complete dyeing. The higher temperatures of from 70–80° C., however, are preferred, since dyeing at this temperature proceeds at a faster rate than at the lower temperatures.

The immersion time, that is, the time the polystyrene particles are in the dye bath, is important since a rough, unsightly appearance results if this time is too long. At a solvent concentration of 5% the immersion time should not exceed 30 minutes. Longer immersion times may be used if the dyeing bath is more dilute with respect to the solvent. The optimum time for any particular dye bath may be determined experimentally.

If desired unexpanded particles may be partially expanded within the dye bath itself by heating the dye bath after dyeing is complete to temperatures of between 90–100° C. to effect expansion.

After dyeing and pre-expansion if it is desired the dyed particles are removed from the dye bath, washed with water and dried. The drying may be carried out using forced air or any other convenient manner. If the particles have not been partially expanded they may then be pre-expanded if desired, or they may be used in any other conventional molding operation.

The following examples further illustrate the practice of this invention.

EXAMPLE IA

*Dyeing*

A dye solution was prepared by adding three grams of Amaplast Yellow G to 40 milliliters of n,n-dimethyl-formamide in a 100 milliliter beaker, and swirling until solution was complete, about 30 seconds. This solution was then added to 2,000 milliliters of water in a large steel beaker and the resulting solution stirred for 30 seconds. There was then added 50 grams of expandable polystyrene beads (Koppers' Dylite) which had been pre-expanded to a density of 2 pounds per cubic foot. The beads were stirred rapidly for 3 minutes. The dye bath was maintained at a temperature of 80° C. during immersion. The beads were then removed, placed on a screen, and then washed with a spray for 60 seconds, and then allowed to air dry.

EXAMPLE IB

Molding

Thereafter the beads were molded into 12" x 12" x ½" blocks using top and bottom steam platens through which the steam is introduced, using the following preset cycle: Steam pressure—17 pounds; mold preheat—30 seconds; steam back pressure—15 pounds; cooking cycle—8 seconds; cooling cycle—120 seconds. The resulting block was removed from the mold, had a smooth even color, and there was no evidence of mottling, cracking, or any other undesirable attribute.

EXAMPLE IIA

Example IA was repeated except that there was substituted for the pre-expanded beads unexpanded polystyrene. The resulting pellets were evenly dyed to a slight depth.

EXAMPLE IIB

These dyed pellets were pre-expanded by radiant heat using the device described in copending application Serial No. 705,540, E. A. Edberg et al., assigned to the assignee of the present invention. These pre-expanded beads were then molded as in Example IB. The resulting block was of a smooth, even color, with no evidence of mottling, crocking, spots or any other undesirable attribute.

EXAMPLE III

The process of Example I was repeated substituting for the Amaplast Yellow G used therein the dyes indicated in Table I below. The results are set forth in this table.

TABLE I

| Dye Name | C.I. Number | Moldability | Sample Color |
|---|---|---|---|
| Solvent Yellow 2 | 11020 | Excellent—No brittleness. | Excellent dark yellow. Shades may be readily accomplished by altering time of slurry. |
| Solvent Red 26 | 26120 | Excellent | Light bright gray red. |
| Disperse Red 9 | 60505 | do | Bright pink. |
| Solvent Orange 7 | 12140 | Good | Brilliant Orange. |
| Vat Red 1 | 73360 | do | Good bright pink. |
| Disperse 11 | 62015 | Excellent | Pinkish violet. |
| Disperse 1 | 61100 | do | Very light violet. |
| Disperse Blue 7 | 62500 | do | Very light blue. |
| Solvent Green 3 | 61565 | do | Good light green-blue. |
| Disperse Blue 22 | 60715 | do | Medium bluish purple. |
| Pigment Blue 15 | 74160 | Brittle | Dye amount must be cut in ratio to pre-puff. |

EXAMPLE IV

Example IA was repeated except that there was substituted for the 3 grams of Amaplast Yellow G 1 gram of Amaplast Blue OAP. Substantially similar results were obtained.

EXAMPLE V

Example IV was repeated except that dyeing times of 2, 1½ and ½ minute were used. The beads ranged from a very dark to a fairly light color, indicating time dependence of the dyeing.

EXAMPLE VI

Example IA was repeated except that the dye bath was maintained at a temperature of 30° C. and the polystyrene particles were immersed therein for a period of six hours. Upon removal, rinsing and drying the particles were found to have been incompletely dyed.

EXAMPLE VII

Example IA was repeated except that the dyeing bath was heated to a temperature of 95° C. in an attempt to dye and pre-expand simultaneously. The immersion time for the particles was two minutes. Upon removal from the bath, rinsing and drying, the particles were found to have a mottled appearance, indicating that the dyeing must be complete prior to expansion.

EXAMPLE VIII

The procedure of Example IA was repeated four times except that there was substituted for the dimethyl formamide used in Example IA dimethyl acetone, dimethyl sulfoxide and N-methylpyrrolidone respectively. At the completion of drying the particles were inspected and found to be somewhat lighter in shade, but otherwise substantially the same as those obtained using the dimethyl formamide.

The foregoing has described a novel, improved process for the dyeing of expandable polystyrene. This novel process permits the production of evenly dyed non-crocking expandable polystyrene pellets, which can be further fabricated by molding to yield a homogenously colored finished article.

I claim:

1. A method of dyeing expandable polystyrene particles which are capable of further expansion comprising immersing said particles for at least 1.5 minutes in an aqueous dye solution comprising from 0.1–7.5% by weight of water of a water insoluble, organic solvent soluble dye, and from 0.1–0.5 mole per liter of water of a solvent selected from the group consisting of dimethyl formamide, dimethyl acetonate, dimethyl sulfoxide and N-methylpyrrolidone, said dyeing solution being heated and maintained at a temperature of less than 90° C.

2. A dyeing solution capable of imparting color to expandable polystyrene particles which are capable of further expansion comprising water, from 0.1–7.5 parts by weight of said water of a water insoluble, organic solvent soluble dye, and from 0.1–0.5 mole per liter of water of a solvent selected from the group consisting of dimethyl formamide, dimethyl acetonate, dimethyl sulfoxide and N-methylpyrrolidone.

3. The composition of claim 2 wherein the solvent is dimethyl formamide.

4. A dye bath capable of imparting color to expandable polystyrene particles which are capable of further expansion comprising 2000 parts of water, 38 parts of dimethyl formamide, and 3 parts of a water insoluble, organic solvent soluble dye.

5. A method of dyeing expandable polystyrene particles which are capable of further expansion comprising immersing said particles for at least 1.5 minutes in an aqueous dyeing solution comprising from 0.1–7.5% by weight of water of a water insoluble, organic solvent soluble dye and from 0.1–0.5 mole per liter of water of a solvent selected from the group consisting of dimethyl formamide, dimethyl acetonate, dimethyl sulfoxide or N-methylpyrrolidone, removing said particles from said aqueous dyeing solution, rinsing said particles with water and thereafter drying said particles, said dyeing solution being heated and maintained at a temperature of less than 90° C.

6. A process for dyeing and expanding expandable polystyrene particles which are capable of further expansion comprising immersing said particles for at least 1.5 minutes in an aqueous dyeing solution comprising from 0.1–7.5% by weight of water of a water insoluble, organic solvent soluable dye and from 0.1–0.5 mole per liter of water of a solvent selected from the group consisting of dimethyl formamide, dimethyl acetonate, dimethyl sulfoxide, and N-methylpyrrolidone, said dyeing solution being heated and maintained at a temperature of less than 90° C. and thereafter heating said dyeing solution to a temperature of greater than 90° C. to further expand said polystyrene particles.

7. A method of dyeing expandable polystyrene particles which are capable of further expansion comprising immersing said particles for at least 1.5 minutes in an aqueous dyeing solution comprising from 0.1–7.5% by weight of water of a water insoluble, organic solvent soluble, dye and from 0.1–0.5 mole per liter of water of dimethyl formamide, said dyeing solution being heated and maintained at a temperature of less than 90° C.

8. A method of dyeing expandable polystyrene particles which are capable of further expansion comprising immersing said particles for at least 1.5 minutes in an aqueous dyeing solution comprising from 0.1–7.5% by weight of water of a water insoluble, organic solvent soluble, dye and from 0.1–0.5 mole per liter of water of dimethyl formamide, said dyeing solution being heated and maintained at a temperature of less than 90° C., removing said particles from said aqueous dyeing solution, rinsing said particles with water, and thereafter drying said particles.

9. A method of dyeing expandable polystyrene particles which are capable of further expansion comprising immersing said particles for at least 1.5 minutes in an aqueous dyeing solution comprising from 0.1–7.5% by weight of water of a water insoluble, organic solvent soluble dye and from 0.1–0.5 mole per liter of water of dimethyl formamide, said dyeing solution being heated and maintained at a temperature of about 85° C.

References Cited in the file of this patent

UNITED STATES PATENTS

| | | |
|---|---|---|
| 2,480,821 | Connell | Sept. 6, 1949 |
| 2,857,341 | Colwell et al. | Oct. 21, 1958 |
| 2,857,342 | Platzer | Oct. 21, 1958 |
| 2,941,970 | Craig | June 21, 1960 |